6317X
J. REED.
Generating Steam for Culinary Purposes.
Patented Jan'y 5, 1831.
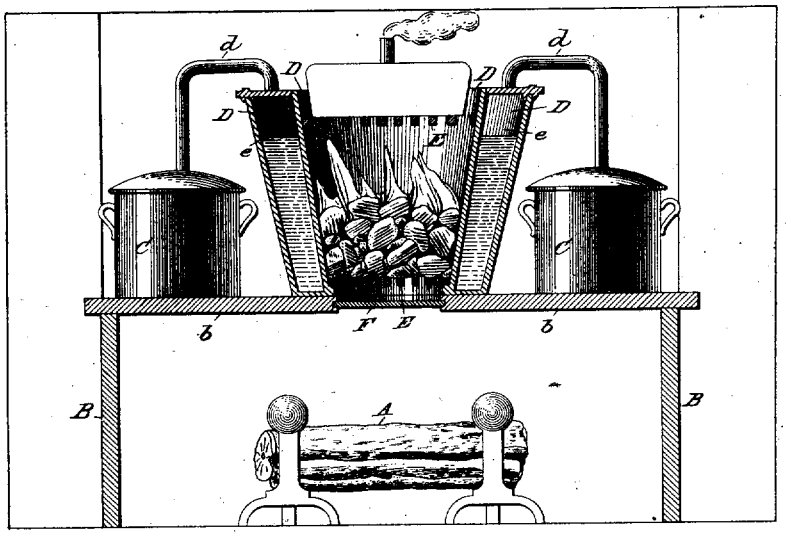
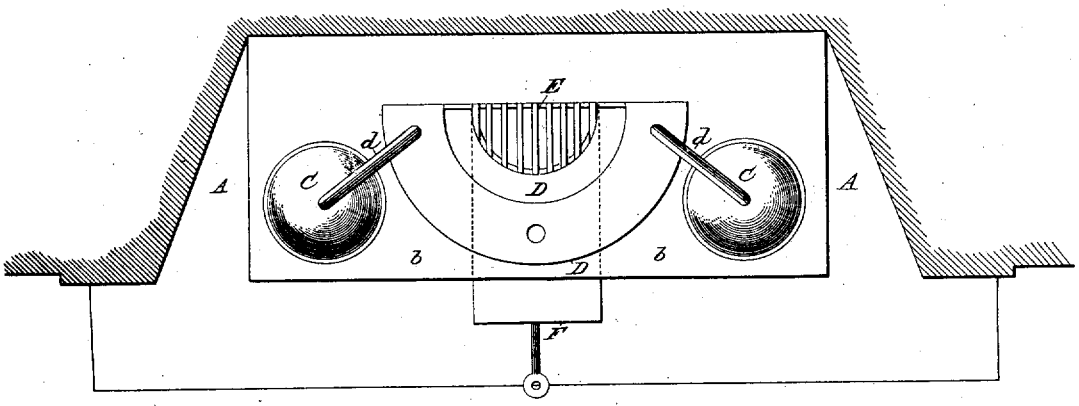
N. PETERS, Photo-Lithographer, Washington, D. C.

Jesse Reed
Letters Patent

X6317
Jan. 5, 1831

The schedule referred to in these Letters Patent and making part
of the same containing, a description in the words of the said Jesse Reed
himself of his improvement in the manner of constructing^a^ furnace
for generating steam for culinary purposes
To all persons to whom these presents shall come.
[illegible] Jesse Reed of Marshfield in the County of Plymouth
and Commonwealth of Massachusetts Machinist sends greet-
ing. Be it known that I the said Jesse Reed have in-
vented constructed made and applied to use a new and use-
ful improvement in the manner of constructing a furnace for gen-
erating ^steam^ for culinary purposes and which for distinction sake,
I call the Culinary Steamer. The simplest mode of fixing,
up my said steamer for use is as follows viz. When placed
in a common fire place as in most cases it will be, it should
fixed so high from the hearth as to admit a sufficient ^current^ of air
for the fire to pass freely up between the grates upon which
the fuel lays, and also to afford room below it for a small fire up-
on the hearth, when wanted. This may be done with bricks or
stone though plates of cast iron set into the fire place with the edg-
es up is the mode I have adopted. that is to say place three
plates of cast iron of sufficient thickness in the chimney fire place,
with their edges up fastened together at the two back corners.
standing upon the hearth, and being ten or fifteen inches high
upon these place another plate horizontally for the steamer to
stand upon. having an aperture about mid^st^ of it corresponding
in size to the bottom of the steamer, which covers it. through which
the air is admitted to pass. The last mentioned plate may be long
enough to furnish a place each side the steamer for cooking ket-
tles a pans to stand upon. or these may stand upon the hearth.
The manner of constructing my said steamer. which I prefer,

XC 317 is by fastening, together by means of screws and nuts two cylindrical flanges— cast iron kettles or pans of equal height placed one within the other and a little flaring from the bottom upwards. The diameter across the bottom of the outside kettle is about ten inches. The diameter across the top is about fifteen inches. The height eleven inches or the dimensions may be varied, as also the form if so preferred. The diameter of the inside kettle is about one third less than the other whereby a circular space between them is afforded for the water. The outer kettle has a rim or flange around the bottom projecting inwardly, nearly at right angles with the sides and broad enough to extend to the inner surface of the inside kettle. with which its edge forms an angle and is made perfectly tight and by means of which a bottom is formed to the space intended to contain the water. Upon the upper surface of this flange and within said space a lip is cast to support the lower end of the inner kettle against which it bears— This kettle has also a rim or flange about three inches wide extending from the top edge outwardly, over the outside rim of the other kettle covering said circular space at the top and by means of eyelets or flanges both edges are firmly secured and screwed together. The kettle being thus fastened the central cavity within the inner one is intended for the fire. at the lower end of which is the grate to sustain the fuel and when the steamer is in its place over the aperture of the horizontal plate the air is freely admitted to pass up through the fire. To the under side of the last mentioned plate a sliding damper of cast iron is fixed to regulate the draft as occasion may require. Another grate is placed within said central cavity over the fire for the ordinary purposes of heating and cooking over the fire as in common clay furnaces, a hole of an inch in diameter is perforated through the upper flange through which the water is conveyed into the boiler. This hole answers also for the safety valve. I make two smaller perforations through said flange

X6317 flange into which I insert steam pipes to conduct the steam in-
to the other vessels for culinary or other purposes. The boiler may
be of a semicircular form & the fire applied to the side or to a section
of it. but in this case there would be a loss of heat. In fastening
the main parts of the steamer together it will be necessary to put
between the parts becoming in contact a sufficiency of suitable
cement to make the seams steam tight. Thin putty made of
white lead and oil will answer. It will be apparent to
every intelligent mind that the form and proportions of my
said steamer as described above need not be rigidly adhered
to but may be variously altered without changing the princi
ple or purpose of said steamer. In many cases it may be
best to supply the waste of water in the boiler with hot water
in which cases it will be found convenient to heat the water
with the steam by means of the steam or conducting pipe,
before it is injected or poured into the boiler. And when a
fire is wanted upon the hearth beneath the boiler it may +
be found necessary to have an opening at the back of the boiler.
that the upright plate for the smoke to pass freely. Bread
may be baked in a close pan within the cooking kettle by
means of a tube in the top of it to conduct the steam from
the bread. The improvement in my said steamer which I
claim to be new consists of such addition of surrounding
parts to the common clay or soap stone furnace now in use
as will enable me to arrest that portion of heat which in
ordinary use escapes through the side of the furnace and
with it to boil the water which generates the steam for the
purposes before mentioned. In testimony that the above is
a true specification of my said improvement as above described
I do hereunto set my hand and seal the nineteenth day of
August in the year of our Lord one thousand eight hundred
and thirty.

Witnesses Geo. Odiorne

Thomas A Dexter

Jesse Reed